United States Patent [19]
Hoffman, Jr.

[11] 3,991,739
[45] Nov. 16, 1976

[54] PORTABLE KITCHEN

[76] Inventor: John R. Hoffman, Jr., P.O. Box 2112, Myrtle Beach, S.C. 29577

[22] Filed: July 15, 1975

[21] Appl. No.: 596,095

[52] U.S. Cl. .............................. 126/268; 126/276
[51] Int. Cl.² ......................................... F24C 5/20
[58] Field of Search ........... 126/268, 276, 265, 390, 126/37 R, 39 A; 312/236, 140.2

[56] References Cited
UNITED STATES PATENTS

| | | | |
|---|---|---|---|
| 1,291,006 | 1/1919 | Ilitz .................................. | 126/276 |
| 1,331,241 | 2/1920 | Converse .......................... | 126/268 |
| 1,730,034 | 10/1929 | Faulk ............................ | 126/390 X |
| 1,739,138 | 12/1929 | Giragosian ...................... | 126/25 R |
| 1,962,454 | 6/1934 | Meanor et al. .................. | 126/268 |
| 3,696,803 | 10/1972 | Holloway, Jr. .................. | 126/276 |

FOREIGN PATENTS OR APPLICATIONS

| | | | |
|---|---|---|---|
| 1,071,415 | 10/1954 | France ............................. | 126/268 |
| 1,203,952 | 1/1960 | France ............................. | 126/268 |

*Primary Examiner*—William F. O'Dea
*Assistant Examiner*—Harold Joyce
*Attorney, Agent, or Firm*—Richard H. Eanes, Jr.

[57] ABSTRACT

A portable food preparation apparatus including deep stainless steel cooking pans on a support and means provided on the cooking pan bottoms to distribute heat and alleviate warping of the stainless steel pans.

4 Claims, 5 Drawing Figures

PORTABLE KITCHEN

BACKGROUND OF THE INVENTION

1. Field of the Invention

This invention relates generally to apparatus for preparing deep fry and casserole type foods and, more particularly, to a portable cooking apparatus on a trailer-type or self-powered vehicle that can be used to feed a plurality of people at any convenient location.

2. Description of the Prior Art

Portable kitchens are known to those skilled in the art. Typical examples of portable cooking apparatus are: U.S. Pat. No. 3,696,803 issued to A. Holloway, Jr. which discloses a mobile type cooking apparatus: U.S. Pat. No. 1,335,941 issued to V. DeCarlo which discloses a mobile cooking apparatus: U.S. Pat. No. 1,291,006 issued to M. Ilitz which discloses a mobile cooking apparatus. Other examples of mobile kitchens are disclosed in the following patents:

U.S. Pat. No. 1,962,454 — Meanor, et al.
U.S. Pat. No. 1,285,304 — Merrill

The above-noted prior art, Meanor, et al. shows a food cart with a canopy rather than a trailer mounted apparatus. The Merrill patent shows a kitchen permanently mounted on a truck.

SUMMARY

Briefly, the subject invention is comprised of a deep cooking pan mounted on a support or a plurality of pans mounted on supports preferably but not necessarily exclusively mounted on a vehicle body which is generally rectangular and which is mounted on at least one pair of wheels for transport. At one end of the vehicle body is mounted a trailer hitch for towing. Centrally located across the vehicle body from side to side is a liquid fuel tank to which is connected the valves to meter gas to burners mounted on the support to supply heat to the cooking pan or pans. A preferred cooking pan is fashioned of stainless steel to the bottom of which a perforated steel layer is attached to prevent warping of the pan bottom and to better conduct heat. The side walls of the pan are rolled outwardly and downwardly to form a skirt to contain heat to the sides of the cooking pan and to provide a flue for exhaust gas which escapes through a hole or holes in the top rolled out portion of the cooking pan. In the case where there are a plurality of pans, an upright flue extends between the pans.

It is within the scope of the invention that the cooking pan and a gas supply on a support can be mounted on legs and thus can be used on a truck at a location or set off the truck for use at any desired location, but more preferably a plurality of cooking pans can be mounted in front of and rear of the fuel tank on the vehicle body.

The cooking pans may be provided with compartments providing for simultaneous diverse substance cooking.

Hinged to the front edge of the front pan is a cover for the pan. Legs are hinged to the top of the cover to support the top and forms a table when the pan top is opened from the closed position. The legs are provided with length adjustable devices. The rear edge of the rear pan similarly mounts a cover-table.

Means are provided to attach a dismountable pipe frame to the transport body for supporting a fabric cover to provide weather protection.

DESCRIPTION OF THE PREFERRED EMBODIMENT

Figure 1:
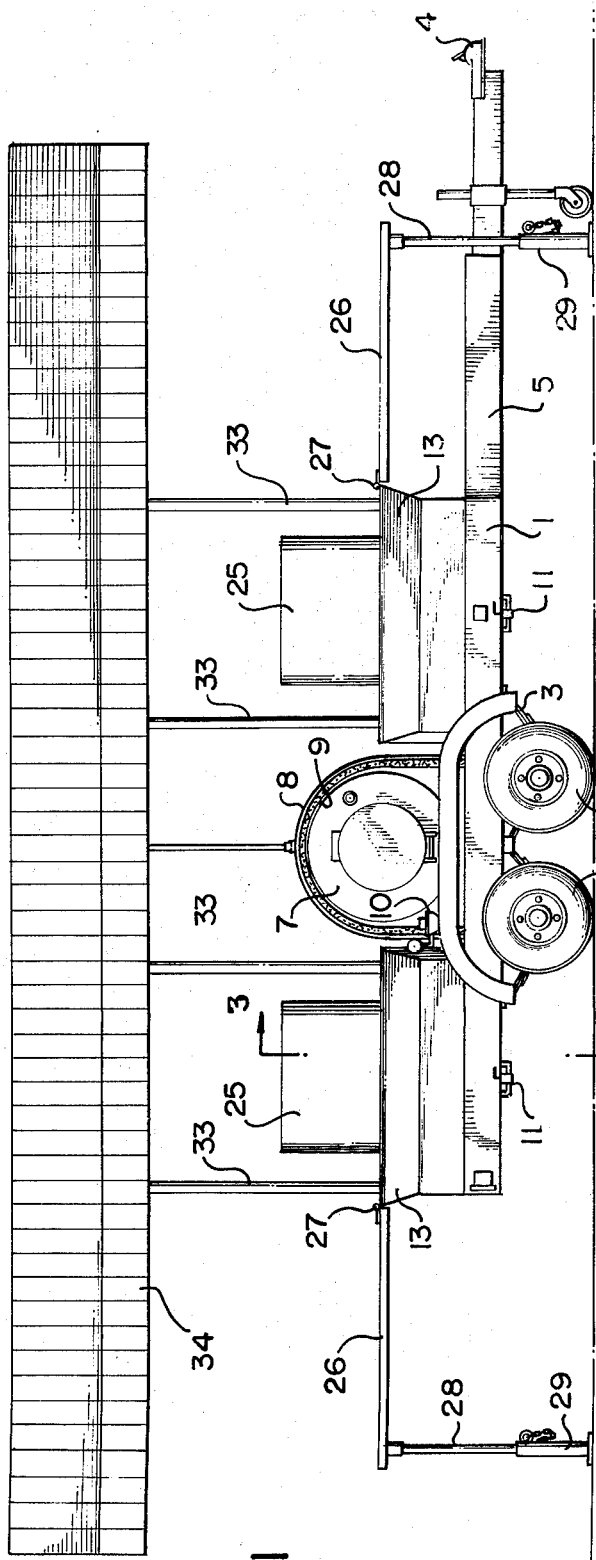
FIG. 1 is a side elevational view of one side of the preferred embodiment of the invention illustrating the portable cooking apparatus with plural cooking pans.

Referring to the drawings wherein like numerals refer to like parts throughout, attention is directed first to FIG. 1. Reference numeral 1 designates a rigid, rectangular metal vehicle body to which is suspended dual wheels 2 and spring assembly 3. The wheels 2 are located mid-length of the vehicle body 1 for weight balance and towing ease. When desirable, other arrangement of the wheels may be used to satisfy the specific needs of the user. It should be stated here that the present configuration is disclosed for purposes of explanation and is not meant to be considered in a limiting sense.

Figure 3:
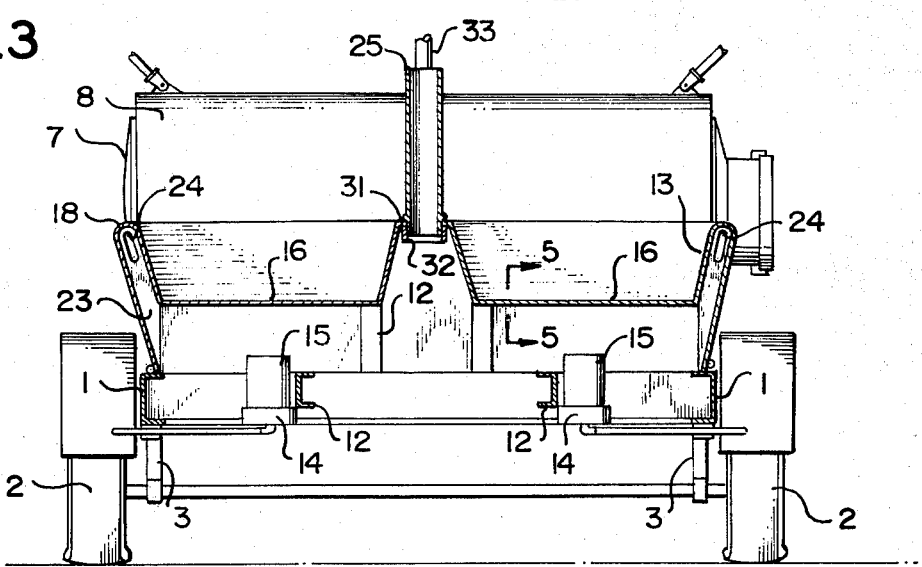
FIG. 3 is a sectional view taken along line 3—3 of FIG. 1 and illustrates the arrangement of the pan and burners on the vehicle frame.
Figure 5:
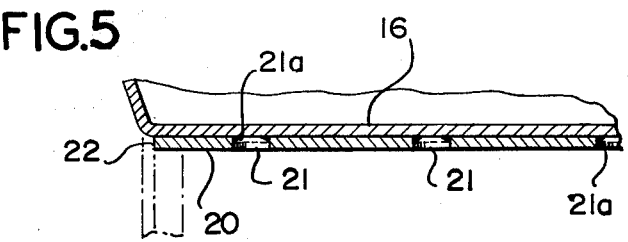
FIG. 5 is a sectional view taken along line 5—5 of FIG. 3 and is illustrative of the joining of the perforated steel outer layer to the stainless steel cooking pan bottom.

On the forward portion of the vehicle body 1 a trailer hitch 4 is attached to the convergence of two extensions 5 angularly extending from the front end of the vehicle body. On the center portion of the vehicle body 1 above the wheels 2 is mounted a liquid fuel tank 7 which contains by example propane liquid gas. The pressure regulator valve 10 and the necessary pipe fittings, not shown, conduct the gas from the tank 7 to the individual burner control valves 11. A metal shield 8 is mounted on the vehicle body 1 to cover the tank in spaced relation to provide against physical damage and insulation against heat. The shield 8 extends down below and across between the vehicle body members 1 to shield heat from the tank. The inner surface of the shield 8 is covered with asbestos insulation 9 to further reduce the transfer of heat to the tank 7. The front and rear of the shield 8 is mounted on frame 1. Directing attention now to FIG. 3. A support frame 12 is mounted on vehicle frame 1 in front and rear of shield 8 to support cooking pan 13, burner holder 14 and burner 15. Cooking pan 13 has a flat bottom 16 secured to frame 12 from which rises the four outside walls 17. The upper part of the side walls 17 is rolled outwardly to form the top 18 and downward to form the skirt 19 extending sufficiently far to contain the heat provided by burners 15 under the pan 13. Plural pans may be preferably mounted in juxta position by removing adjacent rolled tops 18 and substituting a flat closure plate 31. Cooking pan 13 is preferably of stainless steel. Stainless steel cooking pan bottoms are found to be subject to warping. The warping of the stainless steel pan bottom 16 can be minimized when it is covered with a layer 20 of perforated 21 rolled steel by welding the edges 21a of the perforations 21 in the steel to the stainless steel pan bottom 16. The outside edge 22 of the plate 20 is secured to the support 12 and the bottom 16. The support 12 provides passages 23 for the hot gases to surround the sides 17 of the pan 13 to ultimately exhaust through ports 24 located in the front and rear ends in the upper rolled out part 18. An additional removable exhaust vent 25 may be inserted in an opening 32 in the closure plate 31 between the cooking pans when a plurality of cooking compartments are provided as illustrated by example in FIG. 3.

Referring now to FIG. 1, tables 26 are provided at an edge of the cooking pan 13. The table 26 is preferably secured as by a hinge 27 thus providing a cover for pan 13. The outer end of table 26 is adjustably supported by legs 28 having on their lower ends adjusting devices 29.

Figure 4:
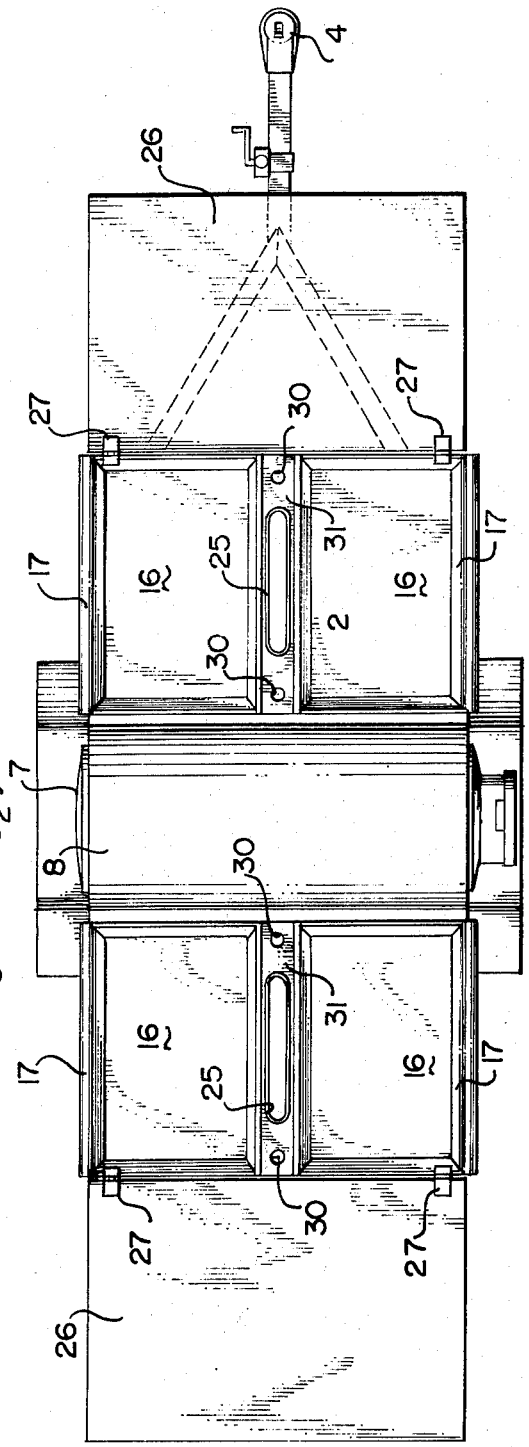
FIG. 4 is a top elevation view of the subject invention with the top and top support removed.
Figure 2:
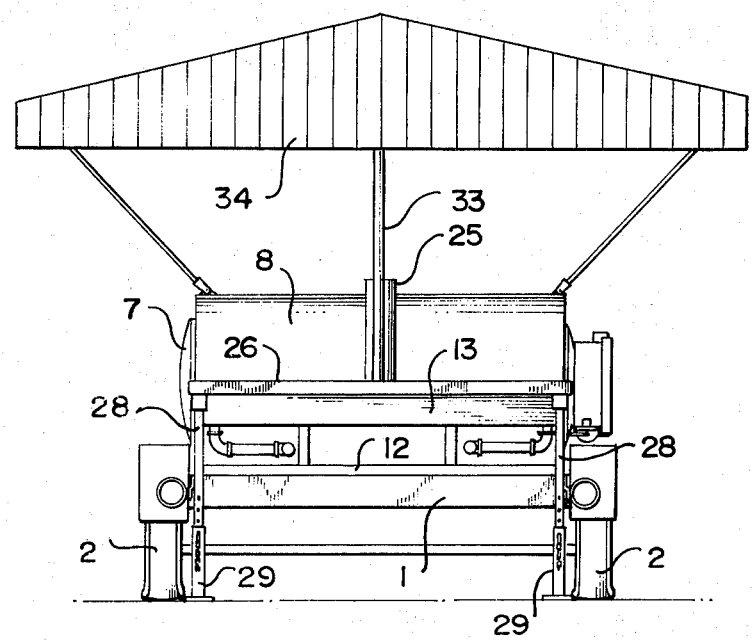
FIG. 2 is a rear elevation view of the subject invention.

Refering to FIG. 4 and FIG. 1, sockets 30 are provided on the closure plate 31 to hold the uprights 33 of the frame for the canvas top 34.

I claim:
1. A cooking apparatus comprising in combination:
a frame having a rear, a front and a central portion;
a pressure fuel container sescured to said central portion of said frame;
support means on said frame in each said rear and front portions;
a first and second cooking pan mounted on said front and rear support means respectively;
each said cooking pan having several adjacent compartments joined at adjacent edges by a flat plate;
each said compartment having a bottom, and side walls rising from said bottom, the side walls forming the outer edges of said cooking pan having the top edge of said walls rolled outwardly and downwardly and extended down to form a heat passage about said compartment;
said bottom having a stainless steel inner and a steel outer layer including regularly spaced openings having their edges welded to said inner layer;
a burner means located on said support under and in registration with each compartment in said cooking pan;
control valve means and fuel lines to couple said fuel tank and said burners.

2. The invention as defined by claim 1 and additionally including wheels on said frame whereby said cooking apparatus can be moved.

3. The invention as defined by claim 1 and additionally including vents in the rolled out portion of the side walls and the compartment joining plate whereby exhaust gases may escape.

4. The invention as defined by claim 1 and additionally including a top support on said plate, a top frame and a top.

* * * * *